(12) United States Patent
Park et al.

(10) Patent No.: US 6,999,064 B2
(45) Date of Patent: Feb. 14, 2006

(54) SINGLE INTEGRATED CIRCUIT FOR OPTICAL MOUSE

(75) Inventors: Keun-Woo Park, Seoul (KR);
Jong-Sik Jeong, Seoul (KR);
Kyoung-Joong Min, Yongin-si (KR);
Kang-ju Kim, Jeollanam-do (KR);
Byoung-Won Hwang, Seoul (KR);
Won-Tae Choi, Suwon-si (KR)

(73) Assignee: Samsung Electro Mechanics Co., Ltd., Kyunggi-Do (KR)

( * ) Notice: Subject to any disclaimer, the term of this patent is extended or adjusted under 35 U.S.C. 154(b) by 319 days.

(21) Appl. No.: 10/413,875

(22) Filed: Apr. 15, 2003

(65) Prior Publication Data

US 2004/0066372 A1   Apr. 8, 2004

(30) Foreign Application Priority Data

Oct. 2, 2002   (KR) ...................... 10-2002-0060269

(51) Int. Cl.
*G09G 5/08* (2006.01)

(52) U.S. Cl. ...................................... 345/166; 345/158
(58) Field of Classification Search ................ 345/166, 345/158, 163–165; 710/8, 100
See application file for complete search history.

(56) References Cited

U.S. PATENT DOCUMENTS

| | | | | |
|---|---|---|---|---|
| 4,631,400 A | * | 12/1986 | Tanner et al. ............... | 250/221 |
| 6,460,094 B1 | * | 10/2002 | Hanson et al. ............... | 710/8 |
| 6,631,303 B1 | * | 10/2003 | de Leon et al. ............. | 700/85 |
| 6,657,184 B1 | * | 12/2003 | Anderson et al. ........... | 250/221 |
| 6,691,201 B1 | * | 2/2004 | Williams et al. ............ | 710/315 |
| 2002/0140677 A1 | * | 10/2002 | Misek et al. ................ | 345/163 |
| 2003/0034959 A1 | * | 2/2003 | Davis et al. ................ | 345/166 |

FOREIGN PATENT DOCUMENTS

KR    1020010028765    5/2001

* cited by examiner

*Primary Examiner*—Alexander Eisen
(74) *Attorney, Agent, or Firm*—Gottlieb, Rackman & Reisman, P.C.

(57) ABSTRACT

Disclosed herein is a single integrated circuit for an optical mouse. The circuit includes an image pixel array for recognizing light and shadow of a surface under the optical mouse, an analog-to-digital converter for receiving analog signal from the image pixel array and converting analog data into digital data, a motion vector calculation unit for converting the digital data into one-bit data and calculating a motion vector, a motion vector process unit for accumulating motion vectors, correcting errors of the motion vectors, and accumulating moving distances of the optical mouse, a timing signal generator for generating control signals to control an overall operation of the circuit and operation signals pursuant to operation states of the circuit, an interface designed to transmit values processed by the process unit into a personal computer, and a transceiver for enabling one of a universal serial bus or an IBM personal system/2 in the interface.

8 Claims, 8 Drawing Sheets

Fig. 1

PRIOR ART

SINGLE INTEGRATED CIRCUIT FOR OPTICAL MOUSE

BACKGROUND OF THE INVENTION

1. Field of the Invention

The present invention relates generally to a single integrated circuit for an optical mouse, and more particularly to a single integrated circuit for an optical mouse, in which an image sensor, an analog-to-digital converter, a digital signal processor for processing digital data output from the converter, a personal computer interface and so on are integrated, thereby automatically selecting one of a universal serial bus and a IBM personal system/2, which are the personal computer interface types, in a hardware manner.

2. Description of the Prior Art

Figure 1:
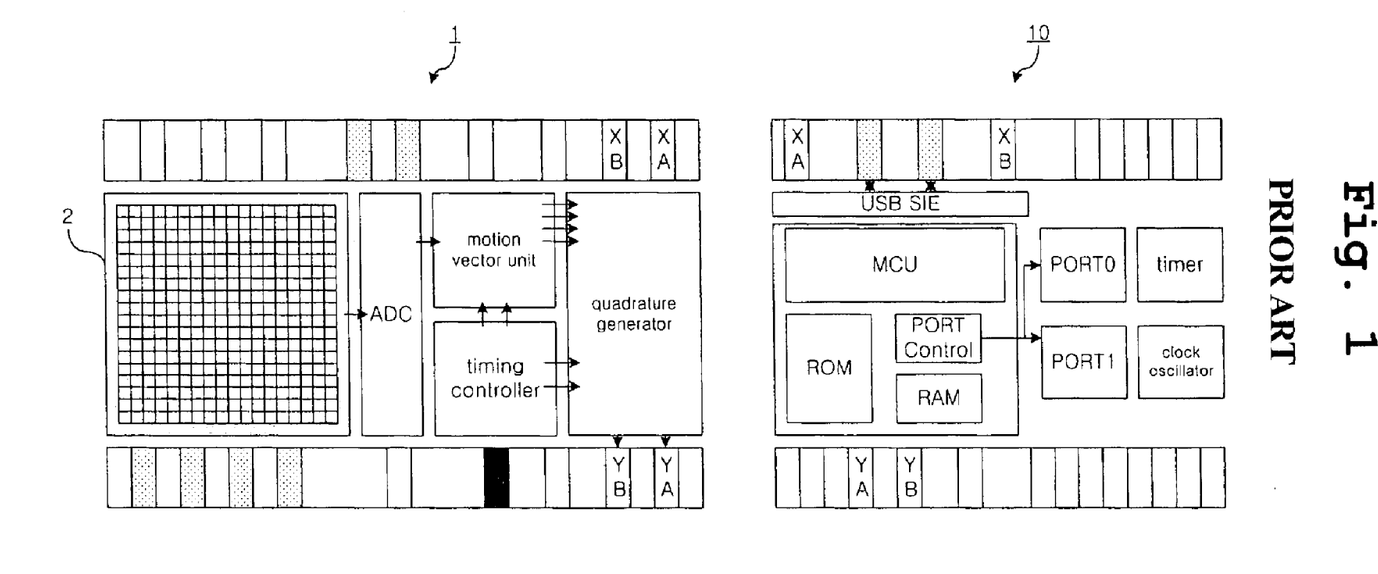
FIG. 1 is a block diagram of conventional integrated circuits for an optical mouse.

Recently, integrated circuits for an optical mouse include two integrated circuits. FIG. 1 is a block diagram of conventional integrated circuits for an optical mouse. Referring to FIG. 1, a first integrated circuit includes an image pixel array 2 that recognizes the light and shadow of a surface under an optical mouse by reacting according to the amounts of light-reflected by the surface, an Analog-to-Digital Converter (ADC) that receives an analog signal from the image pixel array 2 and converts analog data of the image pixels of the image pixel array 2 into digital data, a motion vector unit that converts the digital data output from the analog-to-digital converter and calculates motion vectors using correlations between frame data, and a quadrature generator that generates and outputs interface format signals XA, XB, YA and YB for moving distances of the motion vector unit.

A second integrated circuit 10 includes a general-purpose Main Control Unit (MCU) and a software program for MCU operation. The two integrated circuits 1 and 10 are connected to each other through the interface format signals XA, XB, YA and YB, which are rectangular signals, so the motion data of the optical mouse are transferred from the first integrated circuit to the second integrated circuit. In this case, the motion data of the X axis direction is transmitted by the interface format signals XA and XB, and the motion data of the Y axis direction is transmitted by the interface format signals YA and YB. Further, during the manufacture of the optical mouse, it is necessary to perform a process of embedding the software program in the second integrated circuit 10. Additionally, a module for interpreting the interface format signals XA, XB, YA and YB signals is needed in the software program.

The second integrated circuit 10 includes a Universal Serial Bus (USB) Serial Interface Engine (SIE), a PORT0 and a PORT1, a timer, a clock oscillator, a Read Only Memory (ROM) and a Random Access Memory (RAM). The USB SIE generates signals required for USB interfacing. The PORT0 and the PORT1 are ports whose functions can be defined by the software program since the common MCU is used. The timer allows the software program to check a predetermined time. The clock oscillator is connected to an outside crystal and generates a master clock using the crystal. The ROM and the RAM store the software program and necessary data.

An interface between the optical mouse and a Personal Computer (PC) are designed to correspond to a USB or IBM Personal System/2 (PS/2) type in a software manner. The two integrated circuits are applied to the optical mouse.

As described above, in the optical mouse to which the two integrated circuits are applied, the second integrated circuit are designed to select one of a USB interface and a PS/2 interface in a software manner to interface with the PC.

Accordingly, the conventional integrated circuits for the optical mouse are problematic in that it is essential to perform a process of embedding the software program in the second integrated circuit during the manufacture of the optical mouse and the manufacturing cost of the optical mouse is therefore increased. Additionally, the conventional integrated circuits for the optical mouse are problematic in that the two integrated circuits are used and the pattern of a Printed Circuit Board (PCB) is complicated. Additionally, the conventional integrated circuits for the optical mouse are problematic in that the two integrated circuits of the optical mouse are appropriately interfaced with each other, and the two integrated circuits are consumed because the two integrated circuits are required in manufacturing the optical mouse.

SUMMARY OF THE INVENTION

Accordingly, the present invention has been made keeping in mind the above problems occurring in the prior art, and an object of the present invention is to provide a single integrated circuit for an optical mouse, in which two integrated circuits applied to a general optical mouse are integrated into a single integrated circuit, and one of an USB interface and a PS/2 interface is automatically selected in a hardware manner, thereby reducing the manufacturing cost of the optical mouse and improving the function of the optical mouse.

In order to accomplish the above object, the present invention provides a single integrated circuit for an optical mouse, including an image pixel array for recognizing light and shadow of a surface under the optical mouse by reacting according to amounts of light reflected by the surface, an analog-to-digital converter for receiving analog signal from the image pixel array and converting analog data of image pixels of the image pixel array into digital data, a motion vector calculation unit for converting the digital data output from the analog-to-digital converter into one-bit data and calculating a motion vector, a motion vector process unit for accumulating motion vectors calculated by the motion vector calculation unit, correcting errors of the motion vectors, and accumulating moving distances of the optical mouse, a timing signal generator for generating control signals (to enable or disable some elements of the integrated circuit) to control an overall operation of the integrated circuit and operation signals (to control the operations of the elements on the basis of the operation state and time) pursuant to operation states of the integrated circuit, an interface designed to transmit values processed by the motion vector process unit into a personal computer, and a transceiver for enabling one of a USB or an IBM PS/2 in the interface.

In the present invention, two integrated circuits included in the conventional optical mouse are integrated into a single integrated circuit. Accordingly, the MCU included in the second integrated circuit of the conventional optical mouse to interface with a PC can be eliminated, a process for downloading a software program is not needed because a hardware logic is included in the integrated circuit, and the size and pattern of a PCB become small and simple, respectively.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Hereinafter, preferred embodiments of the present invention are described in detail with reference to the accompanying drawings.

Figure 2:
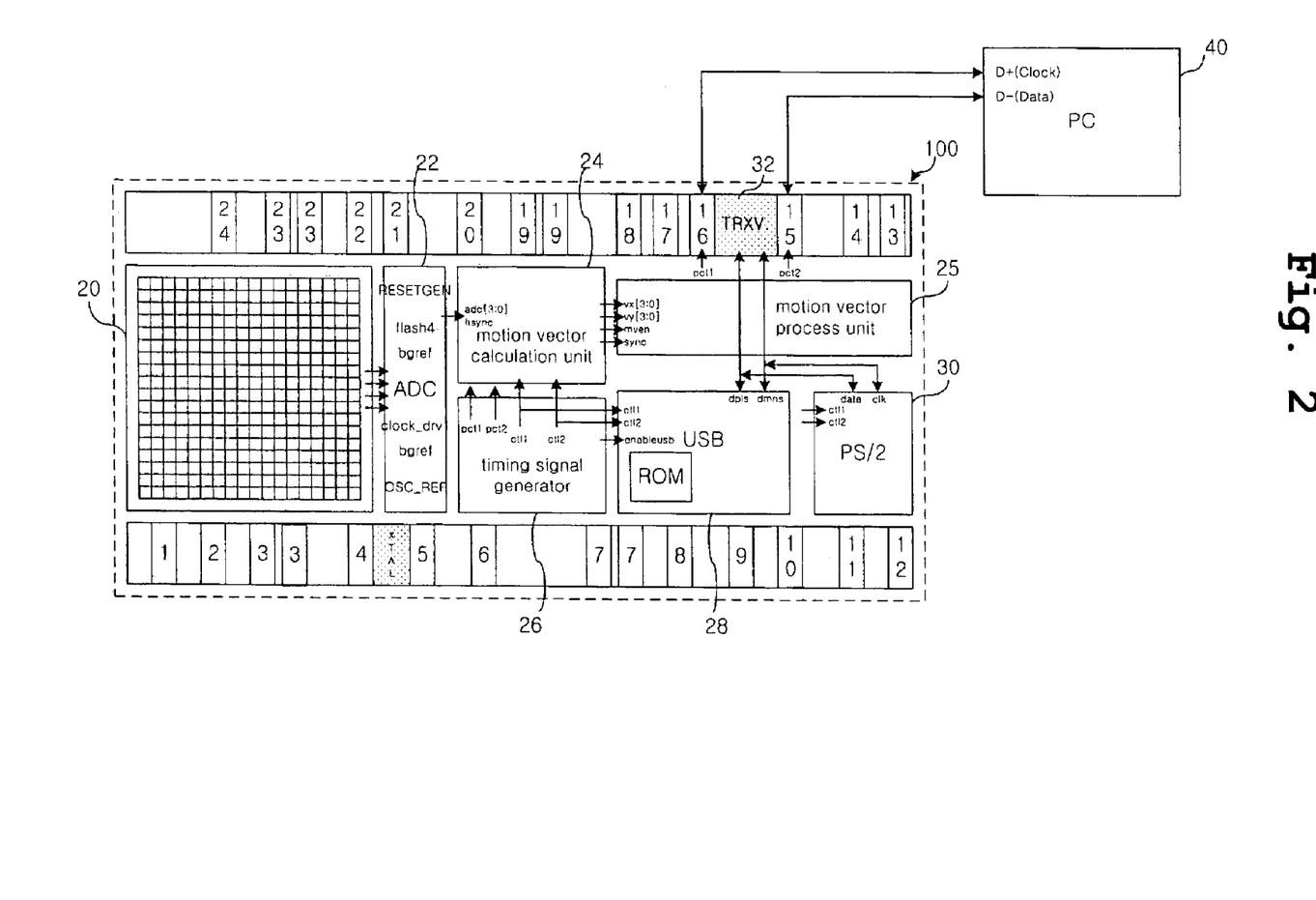
FIG. 2 is a block diagram of a single integrated circuit for an optical mouse in accordance with the present invention.

FIG. 2 is a block diagram of a single integrated circuit for an optical mouse in accordance with the present invention.

An image pixel array 20 is used to recognize the light and shadow of a surface under the optical mouse by reacting according to the amounts of light reflected by the surface.

The image pixel array 20 is constructed so that the amounts of electrical charges stored in the pixels of the image pixel array 20 vary with the amounts and intensity of the light reflected by the surface under the optical mouse. Accordingly, the pixels receive the light for a preset time, and the amounts of electrical charges remaining in the pixels are detected. Thereafter, the detected amounts of electrical charges are converted into digital data through an Analog-to-Digital Converter (ADC) 22. In this case, the size of the image pixel array 20 is 18×18 pixels, that is, 324 pixels, whose sizes are each 53 $\mu$m×53 $\mu$m and whose intervals 10 $\mu$m. Accordingly, the image pixel array 20 can face an area of about 1100 $\mu$m×1100 $\mu$m thereunder. Although the size of the pixel of the image pixel array 20 described above is an example, the size of the pixel of the image pixel array 20 can be embodied as other sizes.

The analog-to-digital converter 22 is used to receive analog signals from the image pixel array 20 and convert the analog data of image pixels of the image pixel array 20 into digital data. The analog-to-digital converter 22 includes a reset generator "RESETGEN" that generates the reset signal of the integrated circuit, a band gap reference "bgref" that generates a reference voltage, and a clock driver "clock_drv1" that amplifies the output signal of an external crystal and supplies the amplified output signal to the integrated circuit, and therefore converts the analog data on the pixels into digital data, for example, four-bit digital data.

Figure 3:
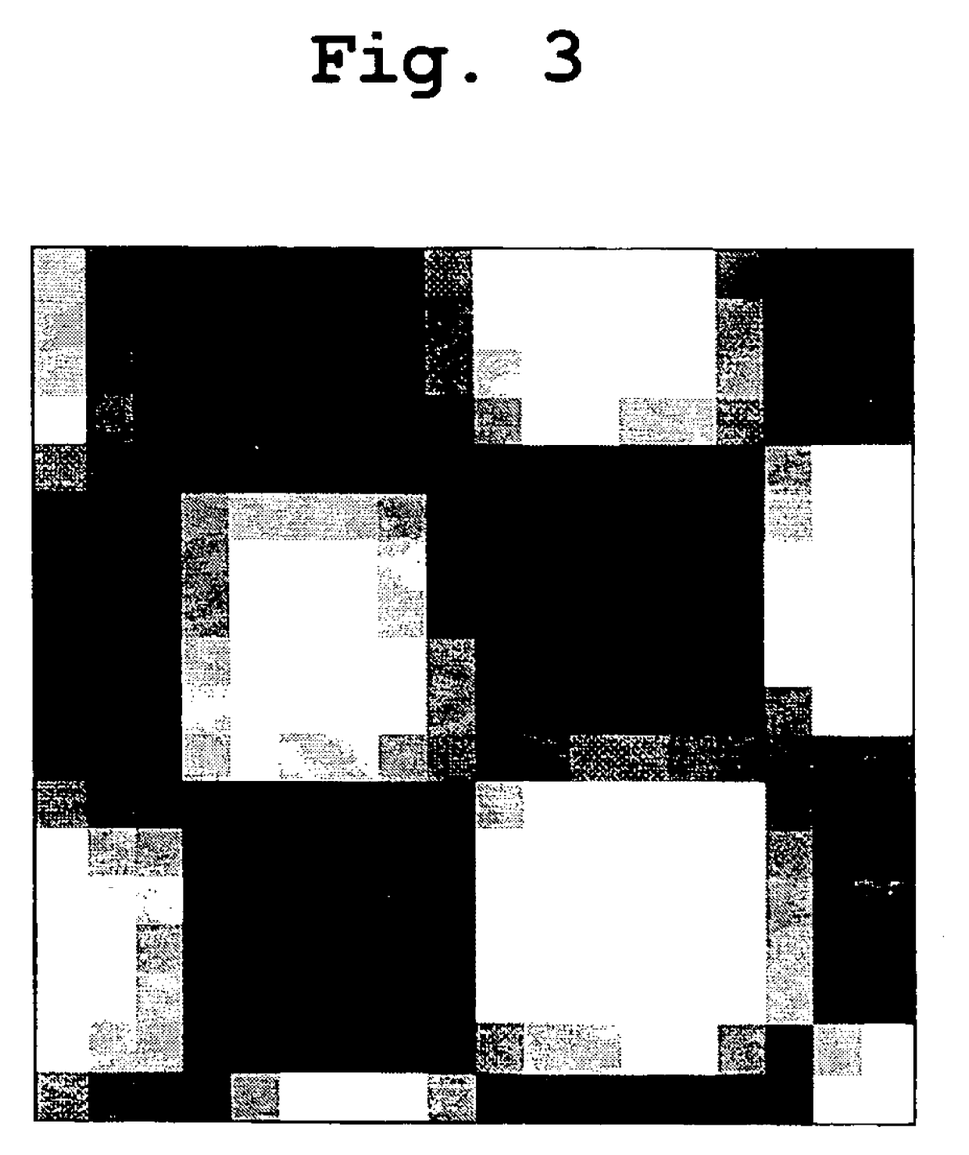
FIG. 3 is one image of a surface under the optical mouse obtained by an image pixel array of the optical mouse in accordance with the present invention.

As described above, the digital data corresponding to the pixels should be obtained to calculate the moving distance of the optical mouse, so the analog-to-digital converter 22 is needed to convert the electric charges of the pixels into the digital data. An example of one image obtained in such an above-described manner is illustrated in FIG. 3. FIG. 3 is one image of a surface under the optical mouse obtained by the image pixel array 20 of the optical mouse in accordance with the present invention.

A motion vector calculation unit 24 stores pixel data input thereto at a present time, for example, four-bit data, in a line buffer, which is a series of buffers storing the pixel data, and calculates the moving distance by comparing the pixel data stored in the line buffer and pixel data next input to the line buffer and detecting a coordinate out of pixels, for example, 18×18 pixels, having the smallest difference between the present pixel data and the next pixel data. If the bit number of the pixel data input to the buffer line is four, the size of the line buffer is 4 bit×18×18, that is, 1296 bits, so the image pixel array 20 occupies the large area of the actual integrated circuit for the optical mouse. Accordingly, the area of the integrated circuit is directly related to the price of the integrated circuit, so a task to reduce the area of the integrated circuit should be performed.

The motion vector calculation unit 24 serves to reduce the size of the line buffer by converting four-bit data input to the line buffer into one-bit data using correlations between data to be converted and surrounding pixel data, and calculates the moving distance and direction (a motion vector) of the optical mouse using correlations between frame data whose size is 18×18 pixels. Thereafter, the motion vector calculation unit 24 transmits calculated data, that is, the motion vector, to a motion vector process unit 25, along with a motion vector enable signal "mven" for synchronizing pixel data and a frame synchronization signal "sync" generated in every frame of 18×18 pixels so as to synchronize the calculated data, that is, the motion vector.

The motion vector process unit 25 accumulates the moving distances of the optical mouse using calculated motion vectors for a preset time required by a PC, and transmits the accumulated moving distances to the USB interface or PS/2 interface. In this case, the motion vector calculation unit 24 may obtain incorrect motion vectors because the pixel data vary with the state of a surface under the optical mouse, so the motion vector process unit 25 is required to perform tasks of detecting and eliminating incorrect values of the motion vectors. For the tasks, the motion vector process unit 25 does not accumulate the motion vectors if the values of the motion vectors are abnormal while the motion vector process unit 25 accumulates the motion vectors for a preset time. For example, the abnormal case is the case where the signs of the values of the motion vectors are sequentially positive, positive, negative, positive, and positive. The reason for this is that the negative sign cannot be actually obtained in terms of the normal movement of the mouse.

A timing signal generator TGEN 26 generates control signals to control an overall operation of the integrated circuit, and provides operation signals to correspond to the operation states of the integrated circuit. The control signals enable or disable some elements of the integrated circuit, and the operation signals control the operations of the elements on the basis of the operation state and time. In the preferred embodiment of the present invention, the time required to read one image of 18×18 pixels is set to 1/1700 second, that is, about 588 $\mu$s. Accordingly, the number of moving pixels is calculated using image data obtained in every 588 $\mu$s. In general, it is determined that a user cannot manipulate the optical mouse to move more than 35 cm in a second.

Accordingly, referring to the general standard of an optical mouse, the maximum velocity of the optical mouse is regulated to 14 inch/sec, that is, about 35 cm/sec. When an image having 18×18 pixels at the time of t=0 are compared to images input at the time intervals, the coordinate value of a location having the smallest difference between the two images can be obtained. The coordinate value may be individually calculated for an X axis and a Y axis, so the values for the X axis and the Y axis are calculated whenever one image is obtained, and accumulated for a preset time. After the coordinate values input are accumulated for the preset time, the accumulated coordinate values are transmitted to the PC at a time required by the PC.

One of a USB 28 and a PS/2 30 receives an enable signal from a transceiver 32 to be enabled, processes the values calculated in the motion vector process unit 25 to pursuant to interface formats, and transmits the processed values to the PC.

The transceiver 32 is a block that converts data to be transmitted to the PC pursuant to the electrical properties of the USB 28, determines which of the USB 28 and the PS/2 30 is selected, and then enables one of the USB 28 and the PS/2 30.

Figure 4:
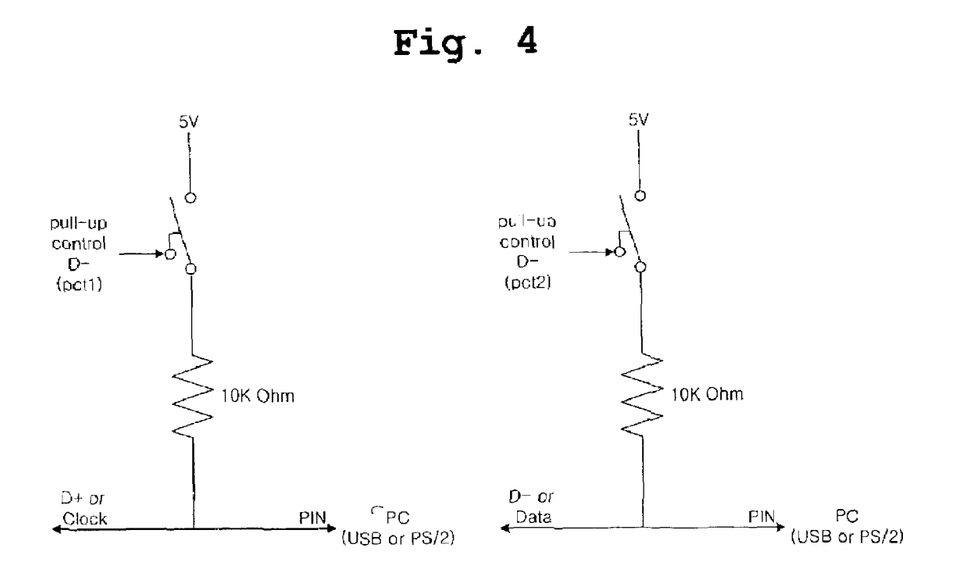
FIG. 4 is a hardware construction of the interface selection part of the transceiver of the single integrated circuit for the optical mouse in accordance with the present invention.

FIG. 4 is a hardware construction of the interface selection part of the transceiver of the single integrated circuit for the optical mouse in accordance with the present invention. As shown in FIG. 4, there are two interface signals D+ and D− in a USB interface mode, and two interface signals Data and Clock in a PS/2 interface mode. In the single integrated circuit of present invention, the two types of the interface each have two pins PINs, D+ and Clock signals use one same pin PIN, and D− and Data signals use the other same pin PIN. That is, the D+ and D− signals or the Clock and Data signals use the two pins PINs according to the interface mode, respectively. The structure of the two pins PINs is illustrated in FIG. 4. The function of the two pins PINs is changed to output the D+ and D− signals or the Clock and Data signals according to the interface mode used in the PC.

It is necessary to ascertain the interface mode at the initial stage in order to determine whether the PC connected to the optical mouse use the USB or the PS/2 interface mode. The D+ and D− signals are LOW in the case of the USB interface mode after power has initially been supplied. Therefore, if the D+ and D− signals are LOW after a preset time, for example, 100 ms, the transceiver 32 detects the states of the signals as LOW and recognizes the interface mode as the USB interface mode. Thereafter, the transceiver 32 enables a pull-up resistor control signal "pct 2" for controlling a pull-up resistor connected to a D− signal line to pull up the D− signal, in order to perform USB interface operation.

In the case of the PS/2 interface mode, pull-up resistors are designed to be basically connected to Clock and Data signal lines. Accordingly, the two Clock and Data signals are HIGH or the Data signal is HIGH after power has initially been supplied. If the Clock and Data signals are HIGH or the Data signal is HIGH after a preset time, for example, 100 ms, the transceiver 32 detects the states of the signals as HIGH and recognizes the interface mode as the PS/2 interface mode.

Figure 5:
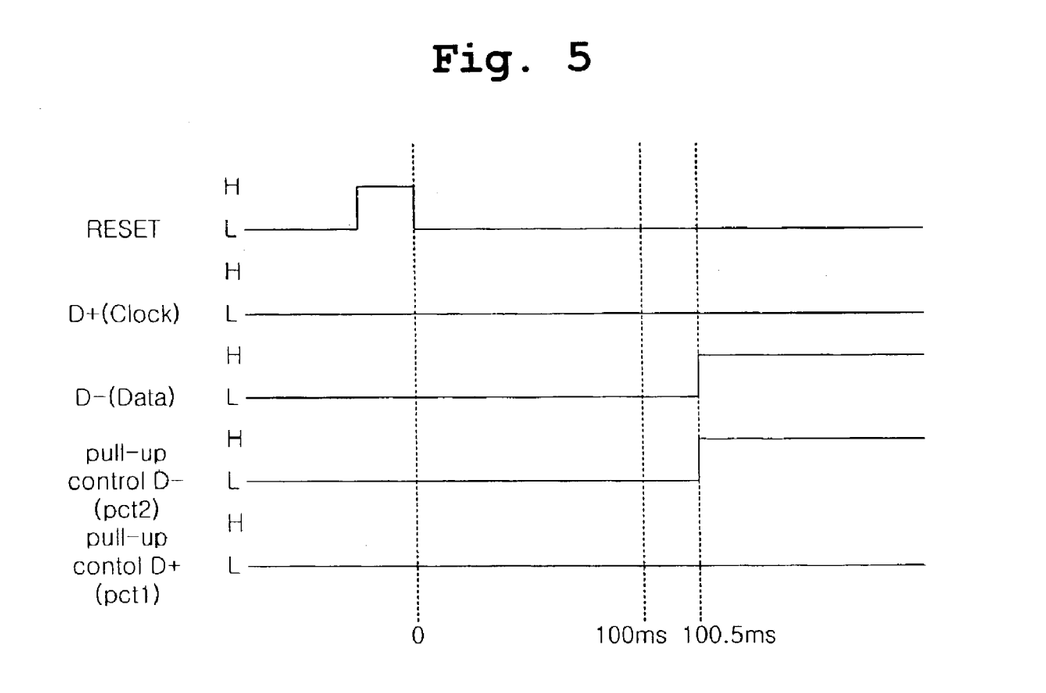
FIG. 5 illustrates an example of a timing diagram of interface signals in the case of a USB interface mode.

FIG. 5 illustrates an example of a timing diagram of the interface signals in the case of the USB interface mode. The states of the D+ and D− signals are checked at the time of 100 ms after a reset signal RESET has been generated. If the states of the D+ and D− signals are determined to be LOW, the pull-up resistor control signal for controlling the pull-up resistor connected to the D− signal line is enabled after 0.5 ms so that D− signal is HIGH. As a result, the USB interface mode is therefore operated. In contrast, the pull-up resistor control signal for controlling the pull-up resistor connected to the D+ signal line is disabled.

Figure 6:
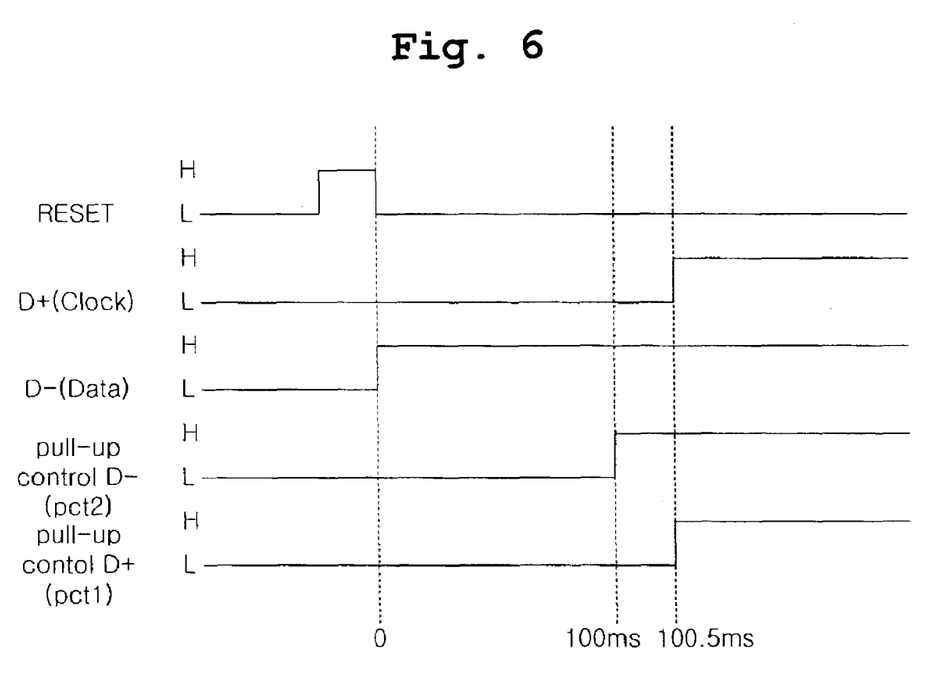
FIG. 6 illustrates an example of a timing diagram of interface signals in the case of a PS/2 interface mode.

FIG. 6 illustrates an example of a timing diagram of the interface signals in the case of the PS/2 interface mode. The states of the Clock and Data signals are checked at the time of 100 ms after a reset signal RESET has been generated. If the state of the Data signal is determined to be HIGH, the pull-up resistor control signal for controlling the pull-up resistor connected to the Data signal line is enabled and the pull-up resistor control signal for controlling the pull-up resistor connected to the Clock signal line is enabled after 0.5 ms so that the two signals are pulled up. As a result, the PS/2 interface mode is therefore operated.

Additionally, in the present invention, in order to reduce the area of the integrated circuit, pixel data is converted to reduce the size of the line buffer that occupies a larger area compared to the other elements of the integrated circuit. It is preferable to maintain the characteristics of an input image at every preset time while reducing pixel data. There are various methods for reducing the pixel data, and which may vary with the characteristics of the image pixel array 20. Examples are shown in FIGS. 7 and 8.

Figure 7:
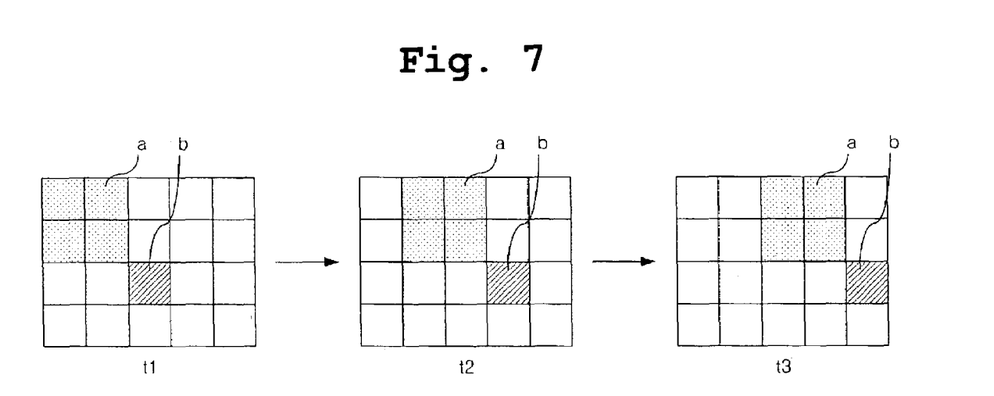
FIGS. 7 and 8 illustrate examples of a method for processing image data in accordance with the present invention.
Figure 8:
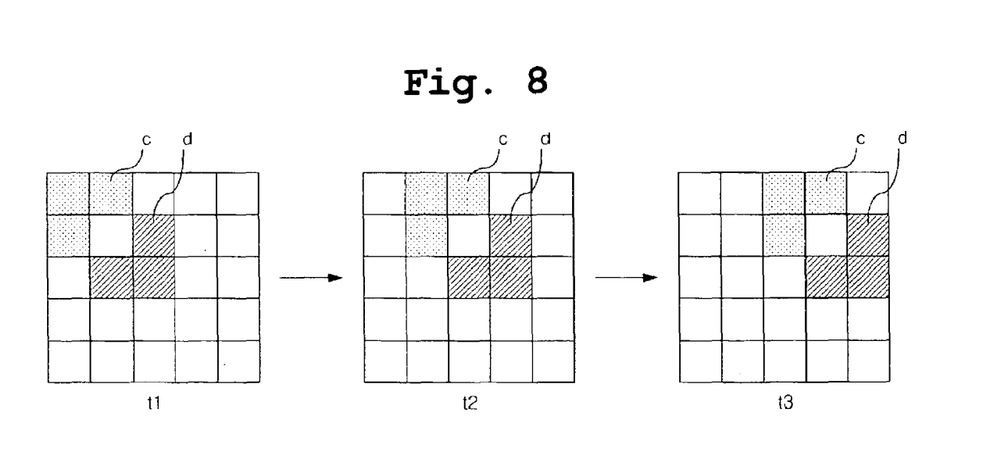

FIGS. 7 and 8 illustrate examples of a method for processing image data in accordance with the present invention. As shown in FIG. 7, the average value of previous four pixels "a" and the value of a present pixel "b" are compared, and the value of the present pixel "b" is recognized as "1" and is stored in a register if the value of the present pixel "b" is greater than the average value of previous four pixels "a"; while the value of the present pixel "b" is recognized as "0" and is stored in the register if the value of the present pixel "b" is equal to or less than the average value of previous four pixels "a".

In FIG. 8, the average value of previous three pixels "c" and the value of present pixels "d" are compared, and the value of the present pixel "d" is recognized as "1" and is stored in the register if the value of the present pixels "d" is greater than the average value of previous three pixels "c", while the value of the present pixels "d", is recognized as "0" and is stored in the register if the value of the present pixels "d" is equal to or less than the average value of previous three pixels "c".

Although simple examples of reducing pixel data are shown in FIGS. 7 and 8, various examples other than the above-described examples can be implemented but are not described herein. If the calculations are performed for 18×18 pixels using the above-described method, the registers of a number of 18×18 are needed, so the number of the registers can be reduced when compared to the case where four-bit pixel data are used.

Accordingly, in the present invention, the number of the registers can be reduced from 1296 to 324. After the calculation of the pixel data is completed, the image pixel array having 18×18 pixels can be represented, as in FIG. 9.

Figure 9:
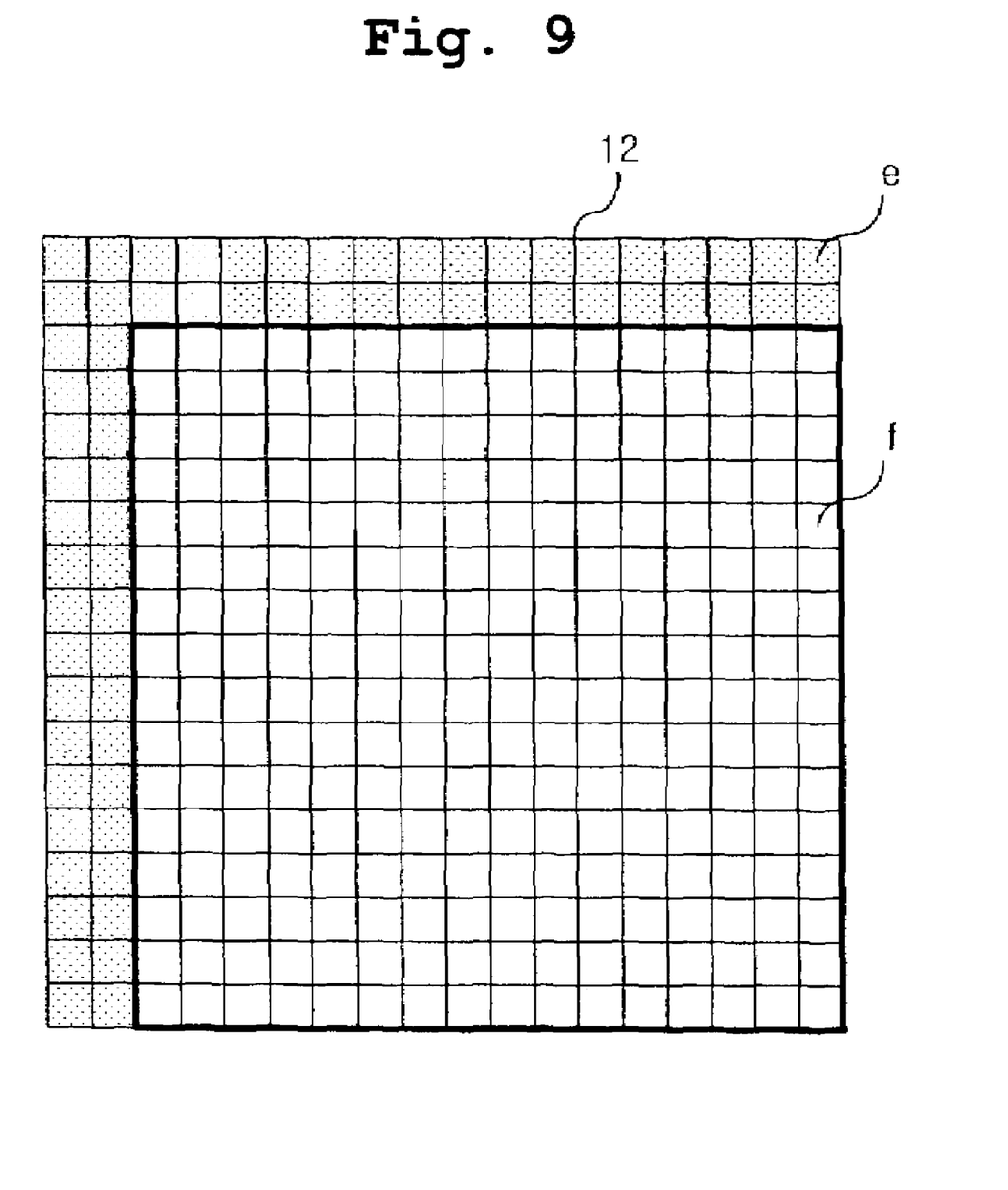
FIG. 9 is a plan view of the image pixel array of the optical mouse of the present invention.

In FIG. 9, a part "e" is set to 1 or 0 since it does not have the basis of calculation, and the remaining part "f" of the image pixel array is set to 1 or 0 on the basis of compared results.

As described above, in the present invention, the functions of two integrated circuits installed in the conventional optical mouse are integrated into a single integrated circuit. Accordingly, hardware logic is included in a single integrated circuit to select an interface with a PC without a second integrated circuit having an MCU needed to interface the optical mouse with the PC, so the process of downloading a software program is not needed to manufacture the optical mouse. In this case, a transceiver, which allows the automatic selection of a USB interface mode or PS/2 interface mode in a hardware manner, is added. Additionally, the manufacturing cost of the optical mouse is decreased using the single integrated circuit instead of two integrated circuits. Additionally, the area of the integrated circuit can be reduced using data conversion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A single integrated circuit for an optical mouse, comprising:
    an image pixel array for recognizing light and shadow of a surface under the optical mouse by reacting according to amounts of light reflected by the surface;
    an analog-to-digital converter for converting each analog data of image pixels of the image pixel array into digital data;
    a motion vector calculation unit for converting the digital data from the analog-to-digital converter into one-bit data and calculating a motion vector;
    a motion vector process unit for accumulating motion vectors calculated by the motion vector calculation unit, correcting errors of the motion vectors, and accumulating moving distances of the optical mouse;
    a timing signal generator for generating control signals to control an overall operation of the integrated circuit and operation signals pursuant to operation states of the integrated circuit;
    an interface designed to transmit values processed by the motion vector process unit into a computer; and
    a transceiver for enabling one of a Universal Serial Bus (USB) or an IBM Personal System/2 (PS/2) in the interface.

2. The single integrated circuit according to claim 1, wherein the transceiver determines whether an interface mode is a USB interface mode or PS/2 interface mode by checking states of two interface signals for a preset time after power is supplied, and generates pull-up resistor control signals for controlling pull-up resistors connected to two pins of two interface signal lines on a basis of the determined interface mode so as to allow the states of the signals to correspond to the determined interface mode.

3. The single integrated circuit according to claim 2, wherein the transceiver checks the states of the two interface signals and recognizes the interface mode as the USB interface mode if the states of the two interface signals are initially low and kept low after a preset time.

4. The single integrated circuit according to claim 2, wherein the transceiver enables or disables the pull-up resistor control signals to allow a pin of a D-interface signal line to be pulled up if the interface mode is determined as the USB interface mode.

5. The single integrated circuit according to claim 2, wherein the transceiver checks the states of the two interface signals and recognizes the interface mode as the PS/2 interface mode if the states of the one or more interface signals are initially high and kept high after a preset time.

6. The single integrated circuit according to claim 2, wherein the transceiver enables or disables the pull-up resistor control signals to allow the two pins of a Clock interface signal and a Data interface signal to be pulled up if the interface mode is determined as the PS/2 interface mode.

7. The single integrated circuit according to claim 1, wherein the analog-to-digital converter includes a reset generator for generating a reset signal of the integrated circuit, a band gap reference for generating a reference voltage, and a clock driver for amplifying an output signal of an crystal and supplying the amplified output signal to the integrated circuit.

8. The single integrated circuit according to claim 1, further comprising a line buffer having a 18×18×1-bit size and receiving one-bit frame data corresponding to the digital data output from the analog-to-digital converter.

* * * * *